(12) United States Patent
Lee (10) Patent No.: US 11,174,968 B2
(45) Date of Patent: Nov. 16, 2021

(54) PIPE CONNECTING APPARATUS

(71) Applicant: JUNGWOO METAL IND. CO., LTD., Yangju-si (KR)

(72) Inventor: Kwang Won Lee, Yangju-si (KR)

(73) Assignee: JUNGWOO METAL IND. CO., LTD., Yangju-si (KR)

( * ) Notice: Subject to any disclaimer, the term of this patent is extended or adjusted under 35 U.S.C. 154(b) by 260 days.

(21) Appl. No.: 16/316,355

(22) PCT Filed: Jun. 28, 2017

(86) PCT No.: PCT/KR2017/006805
§ 371 (c)(1),
(2) Date: Jan. 9, 2019

(87) PCT Pub. No.: WO2018/021702
PCT Pub. Date: Feb. 1, 2018

(65) Prior Publication Data
US 2019/0293211 A1     Sep. 26, 2019

(30) Foreign Application Priority Data

Jul. 27, 2016 (KR) .......................... 10-2016-0095535

(51) Int. Cl.
*F16L 13/14*     (2006.01)
*F16L 17/02*     (2006.01)
(Continued)

(52) U.S. Cl.
CPC ............. *F16L 13/143* (2013.01); *F16L 13/14* (2013.01); *F16L 17/02* (2013.01); *F16L 21/02* (2013.01); *F16L 21/022* (2013.01); *F16L 25/00* (2013.01)

(58) Field of Classification Search
CPC ........ F16L 13/141; F16L 13/142; F16L 13/14
(Continued)

(56) References Cited

U.S. PATENT DOCUMENTS 8,505,983 B2     8/2013  Hiss
8,925,978 B2 *   1/2015  Jamison ................ F16L 13/142
                                                  285/382.2
(Continued)

FOREIGN PATENT DOCUMENTS

CA     2751371 A1 *   8/2010 ............ F16L 13/142
CA     3024666 A1 *  11/2017 ............ F16L 13/142
(Continued)

OTHER PUBLICATIONS

International Search Report for PCT/KR2017/006805 dated Oct. 26, 2017 from Korean Intellectual Property Office.

*Primary Examiner* — David Bochna
(74) *Attorney, Agent, or Firm* — Revolution IP, PLLC (57) ABSTRACT

A pipe connecting apparatus includes: a connector including a large diameter part having a hollow, into which a pipe is inserted, therein and in which at least any one of opposite ends of the hollow has a larger inner diameter such that an accommodation space is formed inside the one end of the hollow, and a pressing part continuously formed along a lengthwise direction of the large diameter part in a direction in which the pipe is inserted, having a smaller diameter than the large diameter part, and formed to surround an outer peripheral surface of the pipe; a ring-shaped sealing member provided in the accommodation space and surrounding the pipe on the outside of the pipe; and a grip member provided in the accommodation space to be adjacent to the sealing member.

10 Claims, 11 Drawing Sheets

(51) Int. Cl.
*F16L 21/02* (2006.01)
*F16L 25/00* (2006.01)

(58) Field of Classification Search
USPC .............................................. 285/382, 382.1
See application file for complete search history.

(56) References Cited

U.S. PATENT DOCUMENTS

| | | | | |
|---|---|---|---|---|
| 9,664,316 | B1 * | 5/2017 | Crompton | F16L 13/142 |
| 2003/0038481 | A1 * | 2/2003 | Viegener | F16L 13/142 |
| | | | | 285/382 |
| 2011/0049875 | A1 * | 3/2011 | Stults | F16L 13/142 |
| | | | | 285/345 |
| 2013/0207386 | A1 * | 8/2013 | Jamison | F16L 13/141 |
| | | | | 285/335 |
| 2015/0285420 | A1 * | 10/2015 | Stout | F16L 13/142 |
| | | | | 285/346 |
| 2019/0067922 | A1 * | 2/2019 | Platt | F16L 13/142 |
| 2020/0300395 | A1 * | 9/2020 | Paige | F16L 13/142 |

FOREIGN PATENT DOCUMENTS

| | | | | |
|---|---|---|---|---|
| DE | 102004044226 A1 * | 12/2005 | ............ | F16L 13/142 |
| EP | 2677225 A2 * | 12/2013 | ............ | F16L 13/142 |
| EP | 3121500 A1 * | 1/2017 | ............ | F16L 13/142 |
| KR | 10-2010-0073424 A | 7/2010 | | |
| KR | 10-2010-0124916 A | 11/2010 | | |
| KR | 10-1196158 B1 | 11/2012 | | |
| KR | 10-1204616 B1 | 11/2012 | | |
| KR | 10-1272272 B1 | 6/2013 | | |
| KR | 10-1377198 B1 | 3/2014 | | |
| KR | 101468508 B1 * | 12/2014 | ............ | F16L 13/142 |

* cited by examiner

PIPE CONNECTING APPARATUS

TECHNICAL FIELD

The present invention relates to a pipe connecting apparatus, and more particularly to a pipe connecting apparatus that improves sealing efficiency by using a grip member having a pair of bosses.

BACKGROUND ART

In general, pipe connecting devices for connecting various types of pipes that are installed in construction fields are used.

A pipe connecting apparatus used conventionally includes a connector that surrounds a connecting portion of a pipe, a grip member that is accommodated in the interior of the connector to grip the pipe, and a sealing member that maintains a sealing state of the pipe and the connector.

Further, the grip member and the sealing member are fixed to the interior of the connector while surrounding an outer peripheral surface of the pipe.

Then, in a generally used method, a large diameter part having a relatively large diameter is provided in a connector, and the large diameter part is pressed in a state in which the pipe is inserted into the large diameter part after the sealing member and the grip member are accommodated in the interior of the large diameter part.

In this way, if the large diameter part is pressed, the sealing member and the grip member are adhered to an outer peripheral surface of the pipe while being pressed, and a portion of the grip member penetrates into the outer peripheral surface of the pipe.

Further, the pressed large diameter part is pressed to surround the grip member and the sealing member together with the outer surface of the pipe so that the the grip member and the sealing member are fixed so as not to deviate.

However, in this method, because an additional force is not provided to opposite sides of the large diameter part when the large diameter part is pressed, the large diameter may come over or may be deformed unintentionally.

Further, when the external force is removed in a state in which the large diameter part comes over or is deformed unintentionally, the connector is not plastically deformed completely by a spring back phenomenon.

That is, the connector cannot stably accommodate and fix the grip member and the sealing member because only the large diameter part is pressed.

Accordingly, a method for solving the problems is required.

PRIOR TECHNICAL DOCUMENTS

Korean Patent No. 10-1196158

Korean Patent Application Publication No. 10-2010-0073424

DISCLOSURE

Technical Problem

The present invention has been made in an effort to solve the above-mentioned problems, and provides a pipe connecting apparatus that prevents a damage to a pipe due to a grip member and achieves a more effective index.

The present invention also provides a pipe connecting apparatus that may stably fix a pipe even when a grip member is deformed by providing a separate pressing part to a connector.

The effects of the present invention are not limited thereto, and other unmentioned effects of the present invention may be clearly appreciated by those skilled in the art from the following descriptions.

Technical Solution

In accordance with an aspect of the present invention, there is provided a pipe connecting apparatus comprising: a connector including a large diameter part having a hollow, into which a pipe is inserted, therein and in which at least any one of opposite ends of the hollow has a larger inner diameter such that an accommodation space is formed inside the one end of the hollow, and a pressing part continuously formed along a lengthwise direction of the large diameter part in a direction in which the pipe is inserted, having a smaller diameter than the large diameter part, and formed to surround an outer peripheral surface of the pipe; a ring-shaped sealing member provided in the accommodation space and surrounding the pipe on the outside of the pipe; and a grip member provided in the accommodation space to be adjacent to the sealing member, wherein at least a portion of the grip member presses an outer peripheral surface of the pipe in a condition in which an outer peripheral surface of the large diameter part is pressed.

The connector may be formed such that the diameter of the connector decreases in a direction from the large diameter part to the pressing part.

The pressing part may be formed as one end of the connector is pressed when the outer peripheral surface of the large diameter part is pressed.

The pressing part and a part of the connector, which faces the pressing part with respect to the large diameter part, may be pressed at the same time when the outer peripheral surface of the large diameter part is pressed.

The grip member may include: a body formed to contact the large diameter part along an inner peripheral surface of the large diameter part; and a plurality of bosses protruding from an inner peripheral surface of the body and formed to be deformed as an outer peripheral surface of the pipe inserted into the hollow is pressed by pressing the outer peripheral surface of the large diameter part.

A pair of bosses may be spaced apart from each other on the body to be cut away to be adjacent to each other, and the cut parts may be pressed to protrude on an inner peripheral surface of the body.

The bosses may be formed such that protruding ends thereof are curved.

The body and the boss may be formed of the same material, and the density of the body may be lower than the density of the bosses.

The body may be formed of a material, the bending strength of which is lower than that of the bosses.

The thickness of a peripheral part of a section of the sealing member may be larger than the thickness of a central part thereof.

A plurality of sealing member each having a ring shape may be provided in the interior of the accommodation space.

At least any one of the plurality of sealing members may have a protrusion protruding while having an inclination in a direction in which the protrusion contacts an outer peripheral surface of the pipe.

The pipe connecting apparatus may further comprise a partitioning member provided between the sealing member and the grip member and configured to space the sealing member and the grip member apart from each other.

The partitioning member may have a rectangular section.

The height of the partitioning member may be lower than the height of the accommodation space.

Advantageous Effects

The pipe connecting apparatus of the present invention for solving the above problems has the following effects.

First, a large diameter may be prevented from coming over when the large diameter is pressed and a pipe may be stably fixe through a pressing part, by forming the pressing part by opposite sides of the large diameter part as well as the large diameter part in a state in which a pipe is inserted into the interior of the connector.

Second, an end of a boss formed in a grip member may be prevented from penetrating into a pipe so that the pipe may be prevented from being damaged, by curving the end of the boss such that the boss is recessed or deformed in a wide area when an outer peripheral surface of the pipe is pressed.

The aspect of the present invention is not limited thereto, and other unmentioned aspects of the present invention may be clearly appreciated by those skilled in the art from the following descriptions.

DESCRIPTION OF THE INVENTION

BEST MODE

Hereinafter, exemplary embodiments of the present invention for realizing the objects in detail will be described with reference to the accompanying drawings. In a description of the embodiments of the present invention, the same titles and reference numerals are used for the same configurations and an additional description thereof will be omitted.

First, a pipe connecting apparatus according to an embodiment of the present invention will be described briefly with reference to FIGS. 1 to 5.

Figure 1:
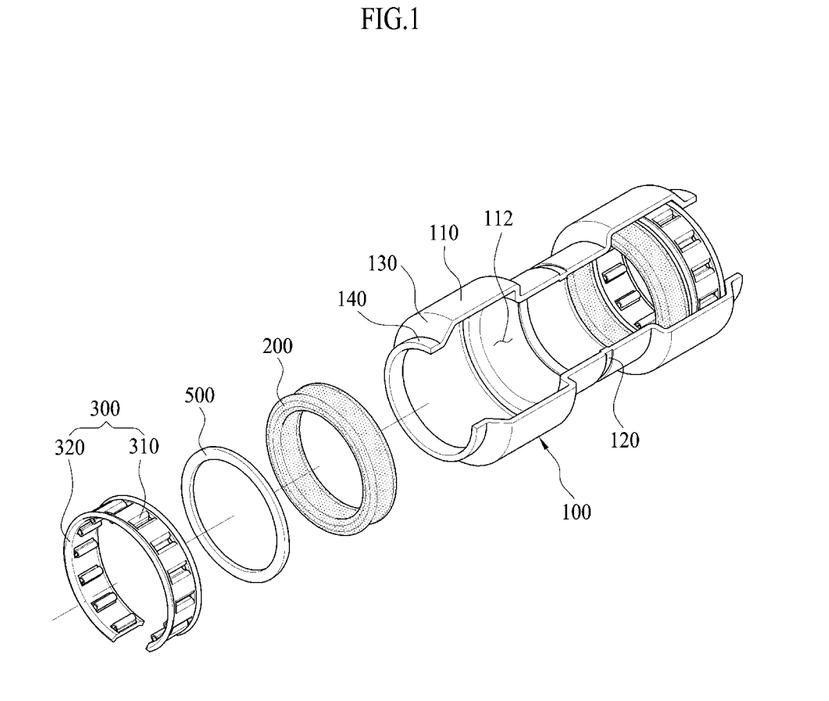
FIG. 1 is an exploded perspective view illustrating a structure of a pipe connecting apparatus according to an embodiment of the present invention.
Figure 2:
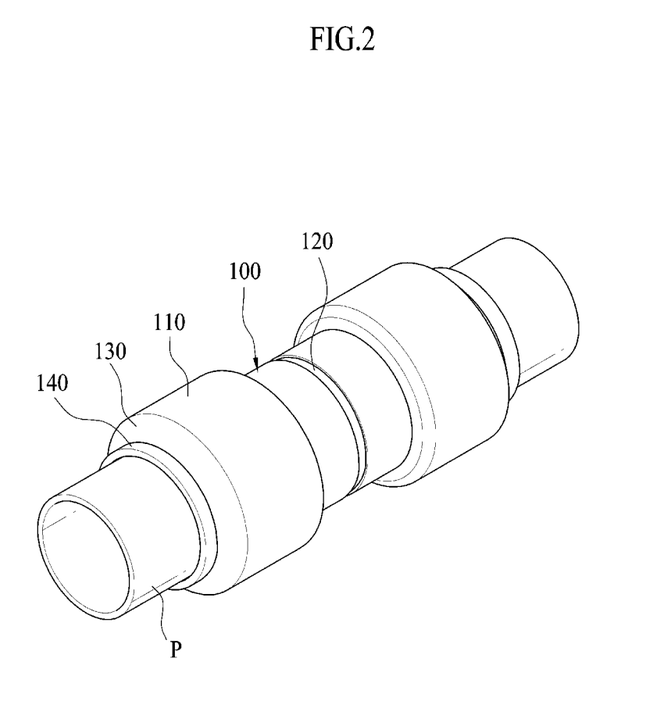
FIG. 2 is a perspective view illustrating a state in which a pipe is inserted into the pipe connecting apparatus according to an embodiment of the present invention.
Figure 3:
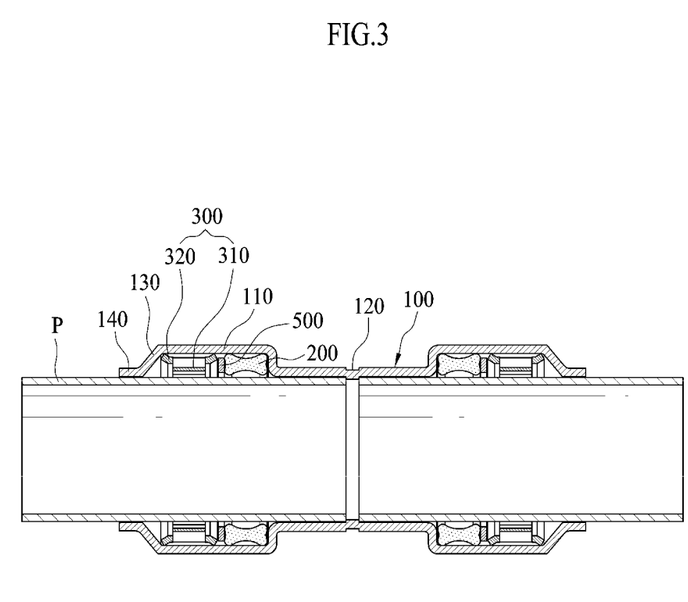
FIG. 3 is a sectional view illustrating the structure of the pipe connecting apparatus according to an embodiment of the present invention.

FIG. 1 is an exploded perspective view illustrating a structure of a pipe connecting apparatus according to an embodiment of the present invention. FIG. 2 is a perspective view illustrating a state in which a pipe is inserted into the pipe connecting apparatus according to an embodiment of the present invention. FIG. 3 is a sectional view illustrating the structure of the pipe connecting apparatus according to an embodiment of the present invention.

Figure 4:
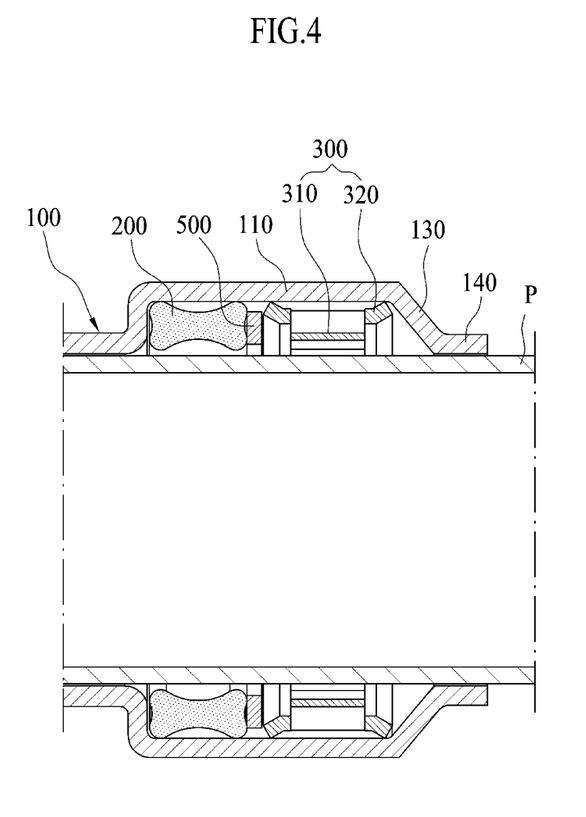
FIG. 4 is a sectional view illustrating an appearance of an accommodation space in the pipe connecting apparatus according to an embodiment of the present invention in more detail.
Figure 5:
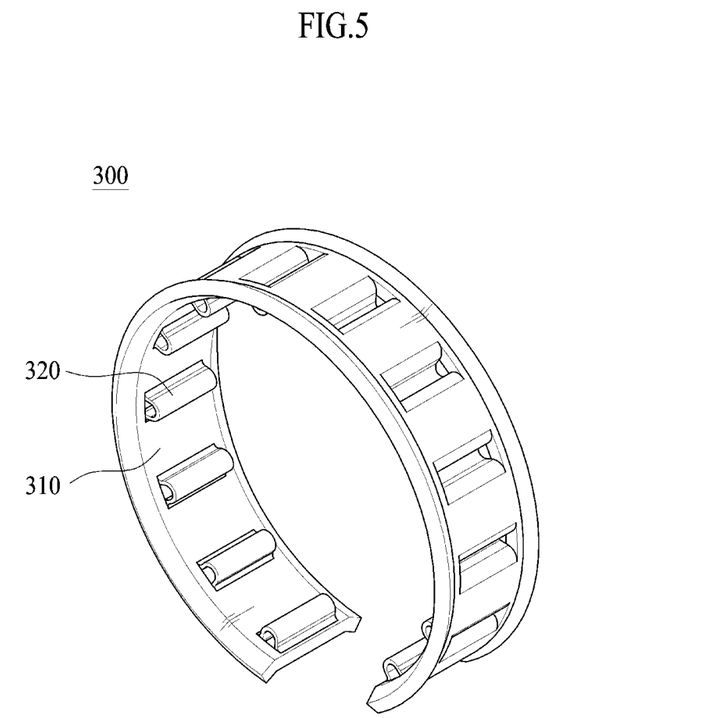
FIG. 5 is a view illustrating a configuration of a grip member according to an embodiment of the present invention.

FIG. 4 is a sectional view illustrating an appearance of an accommodation space in the pipe connecting apparatus according to the embodiment of the present invention in more detail. FIG. 5 is a view illustrating a configuration of a grip member according to an embodiment of the present invention.

As illustrated, the pipe (P) connecting apparatus of the present invention includes a connector 100, a sealing member 200, and a grip member 300.

The connector 100 includes a large diameter part 100 having a hollow, into which a pipe P is inserted, therein and in which at least any one of opposite ends of the hollow has a larger inner diameter such that an accommodation space 112 is formed inside the one end of the hollow.

In the embodiment, large diameter parts 110 are formed at opposite ends of the connector 100 such that a sealing member 200 and a grip member 300 are provided in the accommodation space 112 formed inside the large diameter part 110. However, it is apparent that the large diameter part 110 may be formed only at any one end of the connector 100 unlike the embodiment.

Further, in the embodiment, includes a pressing part 140 formed at a lengthwise end of the connector 100 together with the above-mentioned large diameter part 110 to prevent deviation of the sealing member 200 and the grip member 300 in the interior of the accommodation space 112 and surround an outer peripheral surface of the pipe P.

The pressing part 140 is bent at an end of the large diameter part 110 such that a diameter of the pressing part 140 decreases with a section that is inclined downwards.

In detail, the pressing part 140 is continuously formed along a lengthwise direction of the large diameter part 110 in a direction in which the pipe P is inserted, and is formed to contact the outer peripheral surface of the pipe P while having a smaller diameter than the large diameter 110.

In this way, as the pressing part 140 is formed while being continuously bent from the large diameter part 110, the sealing member 200 and the grip member 300 in the accommodation space 112 is prevented from deviating to the outside and is formed to surround the outer peripheral surface of the pipe P.

Further, a stopper part 120 protruding inwards is formed at a middle part of the connector 100. The stopper part 120 restricts a maximum insertion location of the pipe P by bringing an end of the pipe P into contact with the stopper part 120 when the pipe P is inserted into the connector 100.

On the other hand, the connector 100 has a tapered part 130 that is continuously formed such that a diameter of the tapered part 130 gradually decreases in a direction from the large diameter 110 to the pressing part 140.

In detail, the tapered part 130 is formed such that the diameter of the tapered part 130 decreases toward the pressing part 140 while being continuous between the large diameter part 110 and the pressing part 140.

That is, the tapered part 130 has a margin on a lower side of a part that is adjacent to the large diameter part 110.

Accordingly, the tapered part 130 functions as an absorber such that the connector 100 is smoothly contracted without being distorted to an arbitrary shape when the large diameter part 110 is pressed while the sealing member 200 and the grip member 300 is inserted into the accommodation part 112.

Meanwhile, the sealing member 200 is a component provided in the accommodation space 112 and has a ring shape.

In detail, the sealing member 200 is provided in the interior of the accommodation space 112 and if formed of a flexible material, and is formed to surround the outer peripheral surface of the pipe P to interrupts flows of a fluid along the outer peripheral surface of the pipe P in the interior of the connector 100.

Then, the sealing member 200 is formed of a soft material, but may be hardened over time, and in this case, a side surface of the sealing member 200 may have a mark that is pressed to correspondingly to a shape of the side surface of the grip member 300 while the sealing member 200 is hardened.

In the embodiment, as illustrated in FIG. 4, the thickness of a peripheral part of a section of the sealing member 200 is larger than the thickness of a central part thereof, and accordingly, the sealing member 200 is configured to interrupt flows of the fluid stably even if the sealing member 200 is deformed by an external force.

Then, the sealing member 200 is formed to have one ring shape, but may a plurality of sealing members 200 each having a ring shape and various forms of sections may be provided.

In this way, by providing the sealing member 200, the large diameter part 110 and the pipe P are adhered to each other to maintain a sealing state when the large diameter part 110 is pressed.

Meanwhile, the grip member 300 is a component that is provided in the accommodation space 112 to be adjacent to the sealing member 200.

In detail, the grip member 300 includes a body 310 and a pair of bosses 320. In detail, the body 310 is formed to contact the large diameter part 110 along an inner peripheral surface of the large part 110.

Further, a plurality of bosses 320 are provided to protrude from an inner peripheral surface of the body 310, and is formed to be deformed by pressing the outer peripheral surface of the pipe P inserted into the hollow as the outer peripheral surface of the large diameter part 110 is pressed.

Then, as illustrated in the embodiment, a pair of bosses 320 are formed on the body 310 to cut away to be spaced apart from each other and the cut part is pressed and protrudes from the inner peripheral surface of the body 310.

Here, a protruding end of the boss 320 is formed to have a curved shape, and when the grip member 300 presses the outer peripheral surface of the pipe P, a portion of the protruding end of the boss 320 is deformed together with the outer peripheral surface of the pipe P to fix the pipe P.

In the embodiment, the pipe P may be formed of a copper material, and the grip member 300 is formed of a material, the strength of which is higher than that of the pipe P.

Then, if the end of the boss 320 is formed sharply, a portion of the boss 320 penetrates into the interior of the pipe P, causing damage to the pipe P, when the outer peripheral surface of the pipe P is pressed.

However, as in the present invention, by curving an end of the boss 320, the boss 23120 may be prevented from being damaged as the penetration of the boss 320 into the pipe P is minimized.

Accordingly, the grip member 300 may prevent the pipe P from deviating from the connector 110.

Meanwhile, in order to do this, the grip member 300 is formed such that the bending strength of the body 310 is lower than that of the boss 320 in a condition in which an outer peripheral surface of the large diameter part 110 is pressed.

That is, when the outer peripheral surface of the large diameter part 110 is pressed, the body 310 is deformed first, and accordingly, the boss 320 penetrates into the pipe P while pressing the outer peripheral surface of the pipe P or is deformed so that it may be fixed to the pipe P stably.

Meanwhile, the bending strength of the body 310 may be made to be lower than that of the boss 320 in the grip member 300 through various methods.

For example, the bending strength of the body 310 may be made to be lower, by forming the body 310 and the boss 320 of the same material and making the density of the body 310 lower than the density of the boss 320.

Further, even when the body 310 is formed of a material, the bending strength of which is lower than the bending strength of the boss 320, the same effect may be obtained.

In this way, by forming the grip member 300, the boss 3290 is prevented from penetrating into the outer peripheral surface of the pipe P but is deformed together with the outer peripheral surface of the pipe P so that the grip member 300 may be fixed to the pipe P stably when the outer peripheral surface of the pipe P is pressed.

Additionally, the body 320 according to the present invention is formed such that a peripheral part thereof is bent toward an outside of a circumference thereof separately from the boss 320.

That is, a central part of the body 310 protrudes concentrically.

Accordingly, when the grip member 300 is pressed together with the large diameter part 110 to press the outer peripheral surface of the pipe P, a force is concentrated at a central part of the grip member 300 so that the boss 320 may press the pipe P stably.

Meanwhile, the pipe (P) connecting apparatus according to the present invention may further include a separate partitioning member 500, in addition to the connector 100, the sealing member 200, and the grip member 300, which have been mentioned above.

In detail, the partitioning member 500 is provided between the sealing member 200 and the grip member 300 to space the sealing member 200 and the grip member 300 apart from each other.

In detail, the partitioning member 500 spaces the sealing member 200 and the grip member 300 apart from each other to prevent the sealing member 200 from being worn and damaged by the grip member 300, and accordingly, the durability of the apparatus may be improved.

In particular, in the embodiment, the partitioning member 500 may have a rectangular section, and in this case, the partitioning member 500 may be conveniently manufactured and costs may be lowered due to the simple shape.

With this, the height of the partitioning member 500 may be smaller than the height of the accommodation space 112 of the connector 100. It is because generation of friction between an upper end and a lower end of the partitioning member 500 and the inner surfaces of the connector 100 and the pipe P may be prevented when the partitioning member 500 is pushed axially as the grip member 300 is deformed.

The pipe (P) connecting apparatus according to the present invention is configured in this way, and the connector 100 and the pipe (P) may be stably fixed and a sealing state may be maintained by inserting the pipe (P) into the interior of the connector 100 and pressing the large diameter part 110 and the pressing part 140 with an external force while the sealing member 200 surrounds the outer peripheral surface of the pipe P in the interior of the accommodation space 112.

Subsequently, a process of fixing the pipe P to the connector 100 while the pipe P is inserted in the pipe (P) connecting apparatus will be described below with reference to FIGS. 6 to 8.

Figure 6:
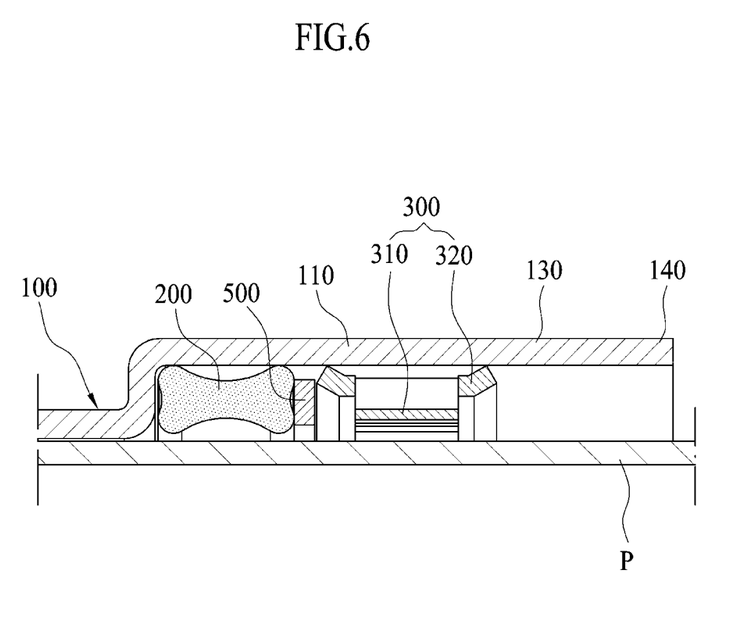
FIG. 6 is a view illustrating a state in which a pipe is inserted into the pipe connecting apparatus according to an embodiment of the present invention.
Figure 7:
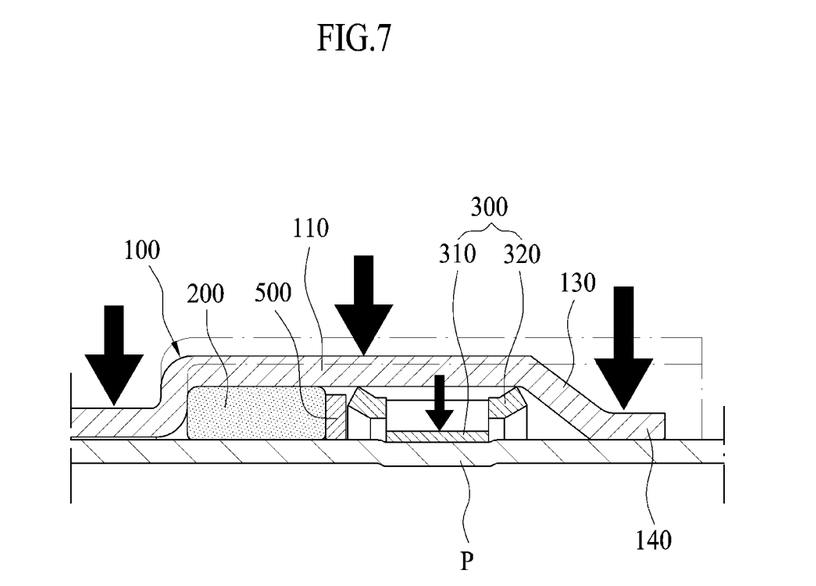
FIG. 7 is a view illustrating a state in which a pressing part is formed while a connector is pressed in the pipe connecting apparatus of FIG. 6.

FIG. 6 is a view illustrating a state in which a pipe P is inserted into the pipe (P) connecting apparatus according to an embodiment of the present invention, FIG. 7 is a view illustrating a state in which the pressing part 140 is formed while the connector 100 is pressed in the pipe (P) connecting apparatus of FIG. 6. FIG. 8 is a view illustrating a state in which the grip member 300 presses the outer peripheral surface of the pipe P while the connector 300 is pressed in the pipe (P) connecting apparatus of FIG. 7.

With reference to the accompanying drawings, an initial state is a state in which the tapered part 130 and the pressing part 140 are not formed in the connector 100.

In this case, the pipe P is inserted into the interior of the connector 100, and the sealing member 200, the partitioning member 500, and the grip member 300 are inserted into the accommodation space 112 in the sequence and surround the outer peripheral surface of the pipe P.

Then, the sealing member 200 and the grip member 300 just surrounds the outer peripheral surface of the pipe P but does not press the outer peripheral surface of the pipe P.

Further, in this state, as illustrated in FIG. 7, the connector 100 is pressed.

Here, when the outer peripheral surface of the large diameter part 110 is pressed, the connector 100 forms the pressing part 140 and the tapered part 130 by pressing an end of the pipe P, which is inserted, together.

Together this, an opposite side of the pipe P, which faces the pressing part 140 with respect to the large diameter part 110, is also pressed.

That is, when the grip member 300 presses the pipe P by pressing the connector 100, a three-point pressing scheme of pressing opposite sides of the large diameter part 110 as well as the large diameter part 110 is used for the pressing.

In this way, the grip member 300 is also pressed through the pressing of the large diameter part 110 and is deformed and fixed while pressing the outer peripheral surface of the pipe P. Further, opposite parts of the large diameter part 110 are prevented from being widened when the large diameter part 110 is pressed by pressing the opposite sides of the large diameter part 110 so that the connector 110 may be plastically deformed stably.

In addition, by pressing the large diameter part 110 and forming the tapered part 130 and the pressing part 140, a space may be formed such that the grip member 300 is deformed and the pressing part 140 may press the pipe P while secondarily surrounding the pipe P.

Accordingly, the tapered part 130 and the pressing part 140 are formed by pressing the opposite sides of the large diameter part 110 together so that the pipe P may be stably fixed by preventing the grip member 300 and the sealing member 200 in the interior of the accommodation space 112 from deviating and from coming over or being widened when the connector 100 is plastically deformed at the same time.

In this way, the three points are pressed with respect to the large diameter part 110 when the connector 100 is pressed, the connector 100 is plastically deformed stably, and the outer peripheral surface of the pipe P is deformed together as the grip member 300 is pressed.

Further, in this way, as the connector 100 is plastically deformed, a spring back phenomenon is not generated and the fastening state may be maintained even when the external force applied to the connector 100 is removed.

Figure 8:
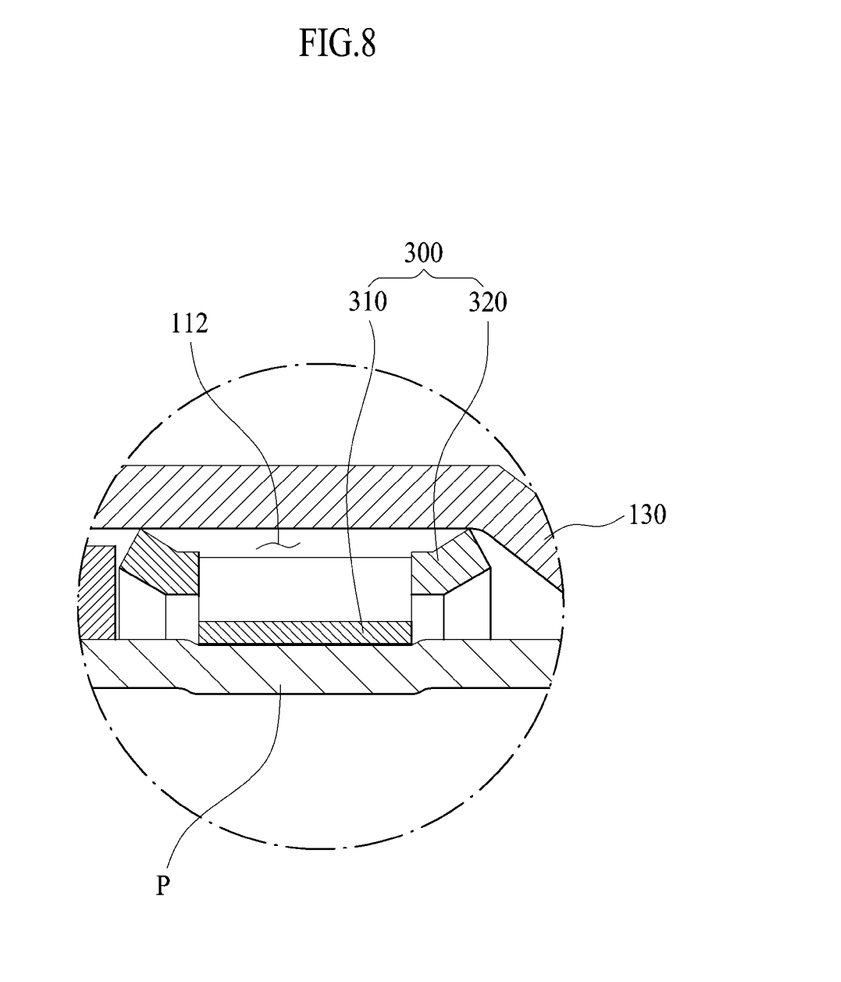
FIG. 8 is a view illustrating a state in which the grip member presses an outer peripheral surface of the pipe in the pipe connecting apparatus of FIG. 7.

Meanwhile, referring to FIG. 8, the grip member 300 presses the outer peripheral surface of the pipe P through the pressing of the large diameter part 110, and in this case, a portion of the outer peripheral surface P is recessed by the boss 320 so that the outer peripheral surface of the pipe P is deformed.

Then, because an end of the boss 320 is curved, the boss 320 does not penetrate into the outer peripheral surface of the pipe P sharply but is recessed or deformed in a curved state.

Although it is illustrated in the embodiment that the outer peripheral surface of the pipe P is recessed by the boss 320, both the outer peripheral surface of the pipe P and the boss 320 may be deformed in an irregular form during the pressing of the boss 320, and accordingly, the grip member 300 and the pipe P are fixed.

Subsequently, a deformed form of the sealing member 200 in the pipe (P) connecting apparatus according to the present invention will be described below with reference to FIG. 9.

Figure 9:
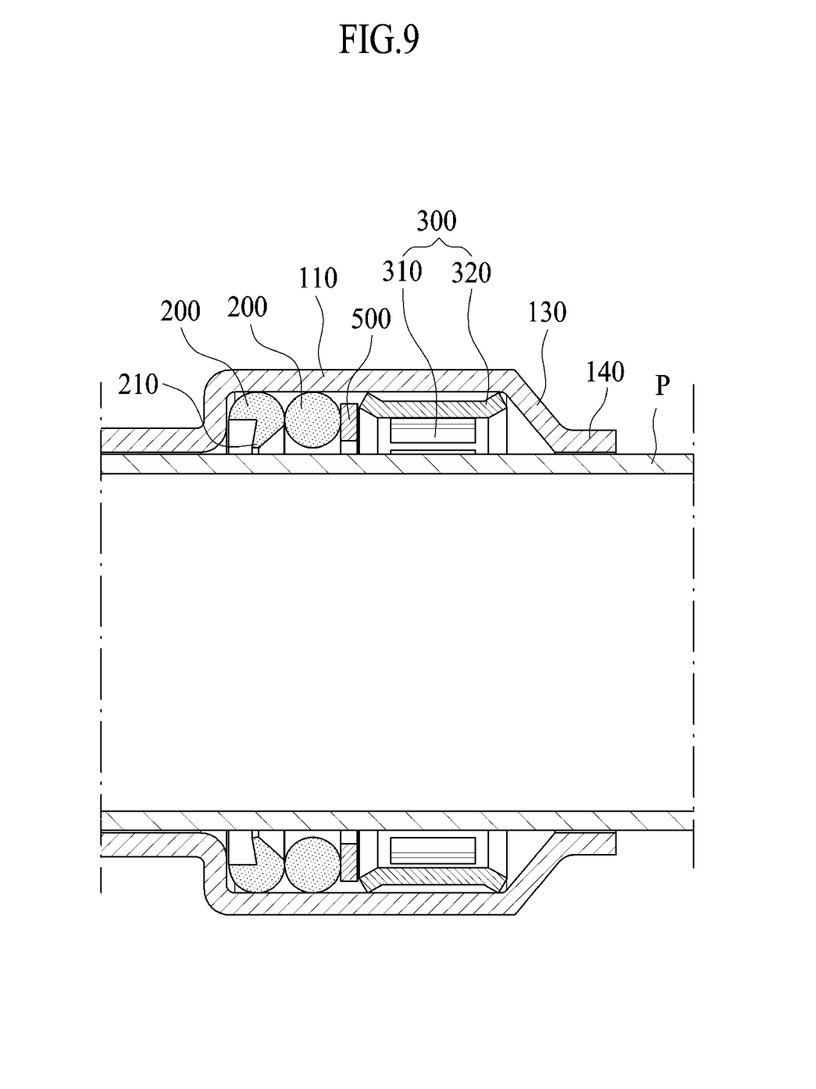
FIG. 9 is a view illustrating an embodiment in which a sealing member is deformed in the pipe connecting apparatus of FIG. 1.

FIG. 9 is a view illustrating an embodiment in which the sealing member 200 is deformed in the pipe (P) connecting apparatus of FIG. 1.

Although the basic configuration is similar to the above-mentioned embodiment with reference to the illustrated drawings, a plurality of sealing members 200 each having a ring shape are continuously disposed in the accommodation space 112.

Then, at least any one of the plurality of sealing members 200 protrudes while having an inclination in a direction in which the sealing member 200 contacts the outer peripheral surface of the pipe P.

In the embodiment, a pair of sealing members 200 are provided, and a protrusion 210 is formed in one sealing member 200, which is located inside the accommodation space 112.

In a description of the function of the protrusion 210, the sealing member 200 is formed of a soft material, but may be hardened over time. Further, when there is not protrusion 210 in the sealing member 200 in a situation in which the sealing member 200 is hardened, the sealing state of the pipe P may become inferior while the sealing member 200 is hardened.

However, by forming the protrusion 210 in the sealing member 200, the protrusion 210 may increase an area of the sealing member 200, which contacts the outer peripheral surface of the pipe P, maintaining the sealing state more stably.

Subsequently, a deformed form of the grip member according to the present invention will be described below with reference to FIGS. 10 and 11.

Figure 10:
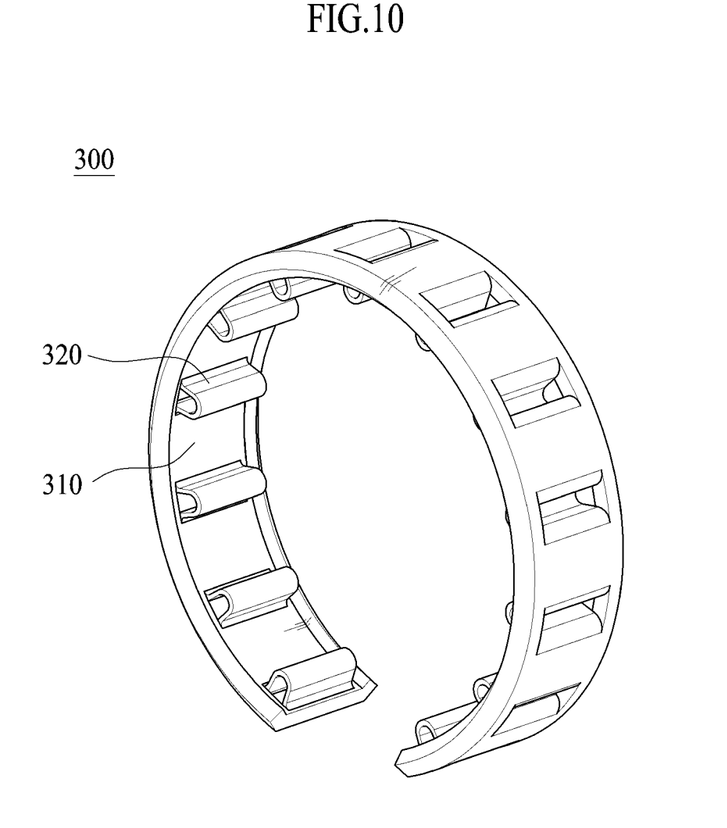
FIG. 10 is a view illustrating a deformed form of the grip member in the pipe connecting apparatus of FIG. 1.

FIG. 10 is a view illustrating an embodiment in which the grip member 300 is deformed in the pipe (P) connecting apparatus of FIG. 1. FIG. 11 is a view illustrating a form in which the grip member 300 of FIG. 10 is deformed while pressing the pipe P.

With reference to the illustrated drawings, the basic configuration of the grip member 300 includes a body 310 and a boss 320 as mentioned above.

However, a peripheral part of the body 310 is bent in a concentric direction, and the diameter of the central part of the body 310 becomes relatively large.

Figure 11:
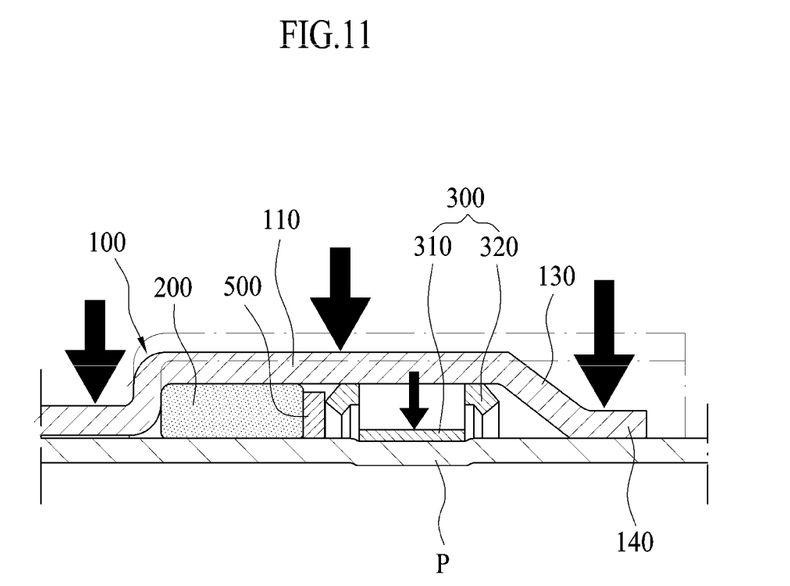
FIG. 11 is a view illustrating a form in which the grip member of FIG. 10 is deformed while pressing the pipe.

In detail, referring to FIG. 11, the grip member 300 is disposed to be adjacent to the above-mentioned partitioning member 500 in the accommodation space 112 and is pressed together with the large diameter part 110 to press the outer peripheral surface of the pipe P.

Further, as an external force is applied to the grip member 300, the body 310 is bent first, and the boss 320 is deformed while pressing the pipe P at the same time.

Then, when a periphery of the grip member 300 is not bent in a concentric direction, a periphery of the body 310 penetrates into a space between the partitioning member 500 and the large diameter part 110, causing a damage.

However, as in the embodiment, when the periphery of the grip member 300 is bent to be inclined downward in a concentric direction, the periphery of the grip member 300 is supported while contacting the partitioning member 500 even if the body 310 is deformed by a pressure, preventing a damage to the large diameter part 110.

Until now, the embodiments of the present invention have been discussed, and it is noted by an ordinary person in the art to which the present invention pertains that the present invention may be embodied in other specific forms without departing from the purpose or categories of the present invention, in addition to the above-mentioned embodiments. Therefore, the above-mentioned embodiments are not restrictive but exemplary, and accordingly, the present invention is not limited to the above description but may be modified within the categories of the claims and the equivalent ranges thereof.

DESCRIPTION OF REFERENCE NUMERALS

100: Connector
110: Large diameter part
120: Stopper part
130: Tapered part
140: Pressing part
200: Sealing member
210: Protrusion
300: Grip member
310: Body
320: Boss
500: Partitioning member
Pipe

The invention claimed is:

1. A pipe connecting apparatus comprising:
a connector including a large diameter part having a hollow, into which a pipe is inserted, therein and in which at least any one of opposite ends of the hollow has a larger inner diameter such that an accommodation space is formed inside the one end of the hollow, and a pressing part continuously formed along a lengthwise direction of the large diameter part in a direction in which the pipe is inserted, having a smaller diameter than the large diameter part, and formed to surround an outer peripheral surface of the pipe, wherein the connector is formed such that the diameter of the connector decreases in a direction from the large diameter part to the pressing part;
a ring-shaped sealing member provided in the accommodation space and surrounding the pipe on the outside of the pipe, wherein the thickness of a peripheral part of a section of the sealing member is larger than the thickness of a central part thereof; and
a grip member provided in the accommodation space to be adjacent to the sealing member,
wherein at least a portion of the grip member presses an outer peripheral surface of the pipe in a condition in which an outer peripheral surface of the large diameter part is pressed,
wherein the grip member includes:
a body formed to contact the large diameter part along an inner peripheral surface of the large diameter part; and
a plurality of bosses protruding from an inner peripheral surface of the body and formed to be deformed as an outer peripheral surface of the pipe inserted into the hollow is pressed by pressing the outer peripheral surface of the large diameter part,
wherein a pair of bosses are spaced apart from each other on the body to be cut away to be adjacent to each other, and the cut parts are pressed to protrude on an inner peripheral surface of the body.

2. The pipe connecting apparatus of claim 1, wherein the pressing part is formed as one end of the connector is pressed when the outer peripheral surface of the large diameter part is pressed.

3. The pipe connecting apparatus of claim 2, wherein the pressing part and a part of the connector, which faces the pressing part with respect to the large diameter part, are pressed at the same time when the outer peripheral surface of the large diameter part is pressed.

4. The pipe connecting apparatus of claim 1, wherein the bosses are formed such that protruding ends thereof are curved.

5. The pipe connecting apparatus of claim 1, wherein the body is formed of a material, the bending strength of which is lower than that of the bosses.

6. The pipe connecting apparatus of claim 1, wherein a plurality of sealing members are provided in the interior of the accommodation space, and each of the plurality of sealing members has a ring shape.

7. The pipe connecting apparatus of claim 6, wherein at least any one of the plurality of sealing members has a protrusion having an inclination in a direction in which the protrusion contacts an outer peripheral surface of the pipe.

8. The pipe connecting apparatus of claim 1, further comprising:
a partitioning member provided between the sealing member and the grip member and configured to space the sealing member and the grip member apart from each other.

9. The pipe connecting apparatus of claim 8, wherein the partitioning member has a rectangular section.

10. The pipe connecting apparatus of claim 8, wherein a diameter of the partitioning member is smaller than a diameter of the accommodation space.

* * * * *